(12) United States Patent
Aielli

(10) Patent No.: US 6,186,523 B1
(45) Date of Patent: Feb. 13, 2001

(54) CONFIGURABLE HORIZONTAL DOLLY AND METHOD OF MANUFACTURE

(76) Inventor: Michael Aielli, 1210 Gingerlily Cove, Austin, TX (US) 78745

( * ) Notice: Under 35 U.S.C. 154(b), the term of this patent shall be extended for 0 days.

(21) Appl. No.: 09/076,232

(22) Filed: May 12, 1998

(51) Int. Cl.[7] .............................. B62B 1/18; B62B 1/20
(52) U.S. Cl. ..................................... 280/47.31; 280/653
(58) Field of Search ................................ 280/47.31, 653, 280/652, 654, 655, 47.315, 47.33; 298/3

(56) References Cited

U.S. PATENT DOCUMENTS

| | | | |
|---|---|---|---|
| 658,555 | * 9/1900 | Perry | 280/47.315 |
| 741,352 | * 10/1903 | Mains | 280/47.31 |
| 795,592 | * 7/1905 | Edick | 280/47.31 |
| 1,527,973 | * 3/1925 | Gilbert | 280/47.31 |
| 2,660,446 | * 11/1953 | Edhardt | 280/47.3 |
| 2,672,348 | * 3/1954 | Scott | 280/47.3 |
| 3,446,510 | * 5/1969 | Seewald | 280/47.315 |
| 3,560,015 | 2/1971 | Tracy et al. | 280/47.3 |
| 3,565,453 | * 2/1971 | Taso | 280/47.31 |
| 3,743,312 | 7/1973 | Gibbons | 280/47.18 |
| 3,751,058 | 8/1973 | Larsen | 280/30 |
| 3,902,733 | 9/1975 | David | 280/47.18 |
| 3,950,004 | 4/1976 | Olsson | 280/47.18 |
| 4,294,548 | 10/1981 | Watson | 366/60 |
| 4,603,872 | 8/1986 | White | 280/47.13 B |
| 5,033,760 | 7/1991 | Evans | 280/47.26 |
| 5,121,970 | 6/1992 | Anderson | 298/3 |
| 5,149,116 | * 9/1992 | Donze et al. | 280/47.31 |
| 5,190,351 | * 3/1993 | Klumpjan | 280/47.31 |
| 5,305,843 | 4/1994 | Armstrong | 180/19.1 |
| 5,690,191 | 11/1997 | Burbank | 188/2 |

* cited by examiner

Primary Examiner—Lanna Mai
Assistant Examiner—Hau Phan
(74) Attorney, Agent, or Firm—Baker Botts L.L.P.

(57) ABSTRACT

A configurable horizontal dolly (10) is provided that allows an operator to move various sized objects. The configurable horizontal dolly comprises a wheel (12) rotatably coupled to a frame (14). Two handles (16) are coupled to frame (14), wherein at least one of the handles (16) is pivotally coupled to frame (14). The pivoting handle allows an operator to use configurable horizontal dolly (10) to move objects of various sizes. The configurable horizontal dolly (10) can have both handles (16) pivotally coupled to frame (14). A configurable horizontal dolly (10) is also provided that has a plurality of platforms (20) coupled to the handles (16) and operable to support an object from below while the handles (16) provide lateral support.

39 Claims, 2 Drawing Sheets

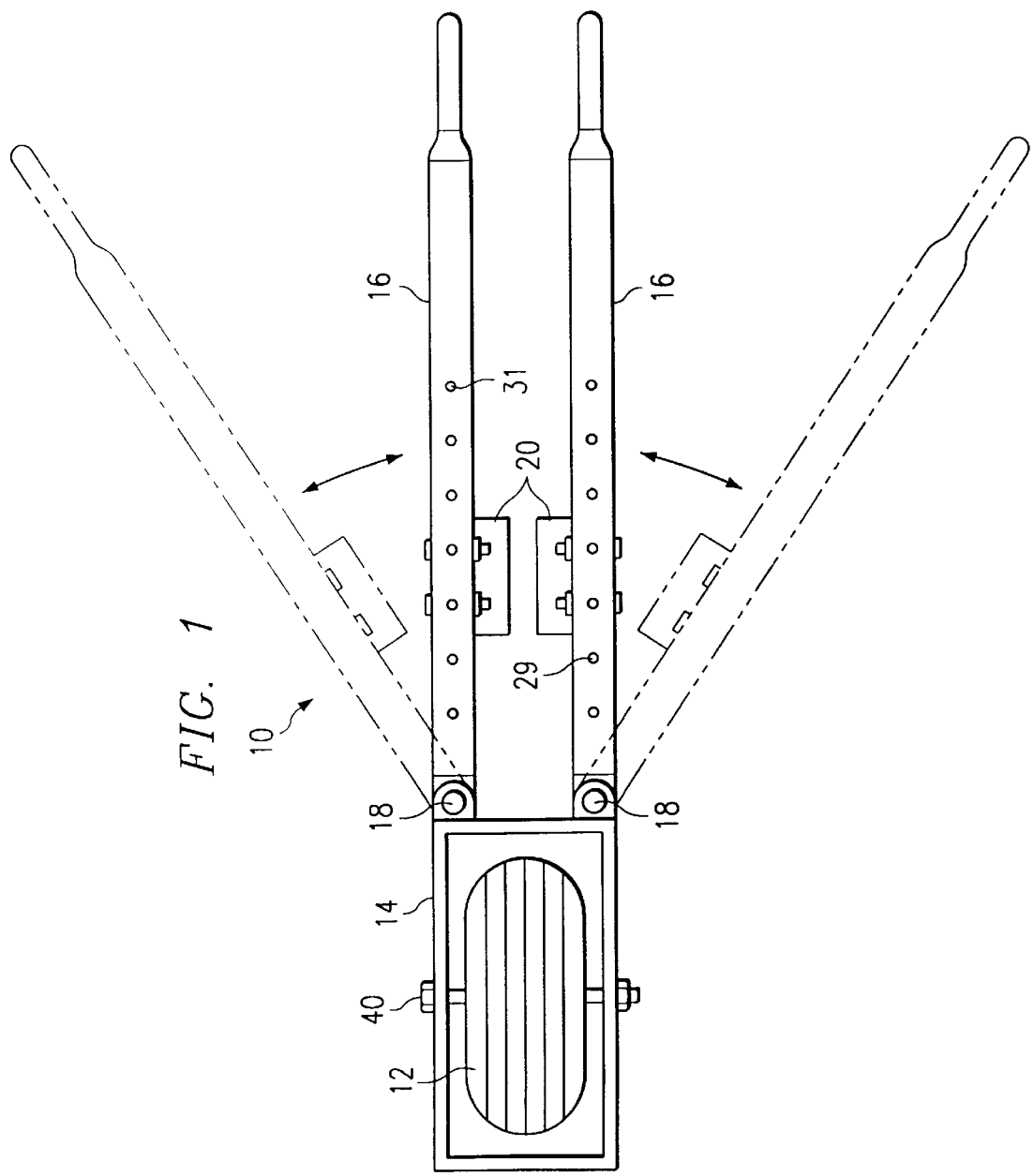

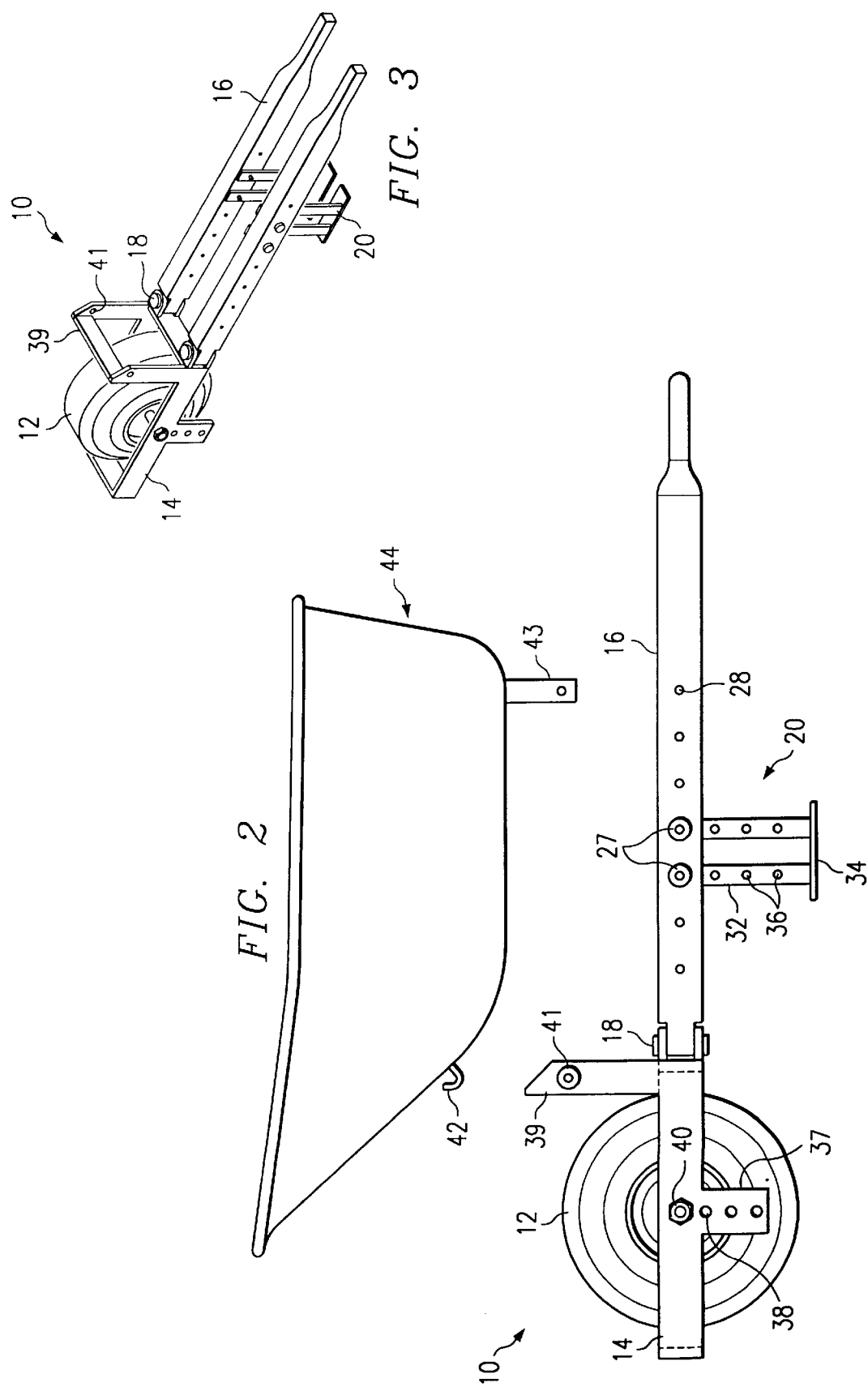

CONFIGURABLE HORIZONTAL DOLLY AND METHOD OF MANUFACTURE

TECHNICAL FIELD OF THE INVENTION

The present invention relates generally to the field of load-bearing equipment and more particularly to a configurable horizontal dolly and method of manufacture.

BACKGROUND OF THE INVENTION

Load-bearing equipment and tools are commonly used to transport various objects. Typically such equipment is manually operated. One type of equipment currently available is a wheel barrow. Conventional wheel barrow systems generally comprise one or more wheels rotatably attached to a frame and a container coupled to the frame. The operator places items to be transported into the container and then lifts up on the frame such that only the wheel or wheels are in contact with the ground. The operator can then transport the items by manually pushing or pulling the wheel barrow.

One disadvantage of such wheel barrow systems is that the size of the object that can be transported is fixed by the size of the container. A further disadvantage is that in order to transport an object, the operator must first pick up the object and place it into a container. If an object is particularly heavy, it is difficult for an operator to perform such a maneuver.

Another type of load-bearing equipment currently available is a device commonly known as a "dolly." Dollies are often used to transport single heavy items such as refrigerators, washing machines, boxes and crates. Typical dolly systems comprise two wheels rotatably attached to a vertical frame and a platform attached to the frame near the wheels for bearing a load. The operator can slide the platform under an object to be moved, rotate the frame backward toward the operator such that only the wheels are in contact with the ground, and then transport the object by pushing or pulling on the frame.

Such dolly systems can be disadvantageous because a significant load is placed upon the operator to prevent the weight of the object from fully rotating the system backwards. Such an occurrence can present a danger to the operator, as the load may rotate on top of the operator. A further disadvantage can result because the dolly supports the load from below and behind, yet there is no lateral support upon the sides of the object. Thus, the operator must prevent the object from slipping to either side. In order to alleviate this disadvantage, some dolly systems include a strap attached to the frame that wraps around the object to be moved. Although such straps may lessen the problem, an object that is wide and heavy still presents a significant burden on the operator. Furthermore, such dolly systems with straps can present a further burden to the operator, as the operator must first wrap the straps around the object before transporting the object.

SUMMARY OF THE INVENTION

In accordance with the present invention, a configurable horizontal dolly and method of manufacture are disclosed that provide significant advantages over previously developed load-bearing equipment.

According to one embodiment of the present invention, a configurable horizontal dolly is provided for moving an object. The configurable horizontal dolly comprises a wheel rotatably coupled to a frame. Two handles couple to the frame wherein at least one of the handles pivotally couples to the frame.

In another embodiment of the present invention, the dolly further comprises one or more platforms coupled to each of the two handles. The platforms extend from the handles and are operable to support an object to be carried from below the object.

It is a technical advantage of the present invention that an operator can transport objects without first lifting the objects and placing them into a container.

It is another technical advantage that an operator can use the horizontal dolly to transport objects of varying sizes by adjusting the handles.

It is a further technical advantage of the present invention that the invention decreases the danger of a load falling back upon the operator.

It is an additional technical advantage of the present invention that the configurable dolly laterally supports an object that is being transported.

Other technical advantages should be apparent to one of ordinary skill in the art in view of the specification, claims, and drawings.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIG. 1 is a top plan view of one embodiment of a configurable horizontal dolly according to the present invention;

FIG. 2 is a side plan view of one embodiment of a configurable horizontal dolly according to the present invention; and FIG. 3 is a rear plan view of one embodiment of a configurable horizontal dolly according to the present invention.

DETAILED DESCRIPTION OF THE INVENTION

FIG. 1 is a top plan view of one embodiment of a configurable horizontal dolly, indicated generally at 10, according to the present invention. Horizontal dolly 10 can comprise a wheel 12 coupled to a frame 14 such that wheel 12 can rotate. For example, wheel 12 could rotate about axle 40 which is attached to frame 14. Those of ordinary skill in the art will recognize that frame 14 can be formed to surround wheel 12 as shown, or can comprise a number of different configurations. Handles 16 can be pivotally coupled to frame 14 such that handles 16 can pivot as shown in FIG. 1. For example, handles 16 could be coupled to frame 14 using pivot joints 18. In the embodiment shown, each of handles 16 couple to a pivot joint 18. However, it is contemplated that another embodiment of the present invention may have one handle 16 fixedly attached to frame 14 while the other handle 16 is pivotally attached to frame 14, for example via a pivot joint 18. It is further contemplated that another embodiment may allow a user to change the point of coupling at pivot joints 18 to place the handles 16 closer together or farther apart along the ends of handles 16 that couple to frame 14. Another embodiment of the current invention could allow a user to change the point of coupling of handles 16 to frame 14 vertically.

In the embodiment of FIG. 1, horizontal dolly 10 further comprises platforms 20, each coupled to a handle 16. Although the embodiment in FIG. 1 has two platforms 20, it is contemplated that only one platform 20 may be coupled to one of the handles 16 or that more than two platforms 20 may be coupled to handles 16 in various configurations. As shown in FIG. 1, horizontal dolly 10 can further comprise a plurality of mating joints 29, 31 in each of handles 16. Platforms 20 can detachably couple to any of the mating joints 29, 31. For example, the mating joints 29, 31 could comprise holes drilled into handles 16 such that a portion of platform 20 sticks up through mating joints 29, 31 (i.e., a portion of platforms 20 extends through handles 16 out of the page through mating joints 29, 31). A bolt and a nut could travel through platforms 20 and holes drilled laterally through handles 16 to couple platforms 20 to handles 16.

In operation, a user can grasp handles 16 at the end distant from wheel 12 and raise handles 16 upward (out of the page). An object can be supported between handles 16. Horizontal dolly 10 can then be moved along the ground via wheel 12 while supporting the object off of the ground between handles 16. Additionally, the object can be supported by platforms 20 and by handles 16.

It is a technical advantage of the current invention that a user of horizontal dolly 10 can move objects of various sizes by pivoting handles 16. It is a further technical advantage of the present invention that objects can be laterally supported by handles 16.

It is another technical advantage of the invention that the object can be further supported from below by platforms 20 in addition to the lateral support provided by handles 16. Platforms 20 may be placed in various locations along handles 16 to accommodate various size loads. It is a further technical advantage that platforms 20 may be placed in various configurations to create enhanced stability of the object being carried. For example, a user could couple one platform 20 in a particular mating joint 29 close to wheel 12 on one handle 16, and could couple another platform 20 in a different particular mating joint 31 on the other handle 16. Thus, the object carried by horizontal dolly 10 would be supported from below in such a way as to prevent the load from pivoting.

FIG. 2 is a side plan view of one embodiment of a configurable horizontal dolly according to the present invention. As shown, horizontal dolly 10 can comprise wheel 12 coupled to frame 14. Handle 16 pivotally couples to frame 14 via pivot joint 18. For example, pivot joint 18 could comprise a 180 degree hinge. Alternatively, pivot joint 18 could comprise a nut and bolt type configuration (as shown). Horizontal dolly 10 can have a platform 20 coupled to handle 16. In this embodiment, platform 20 comprises two members 32 which couple to handle 16 and a stand 34 which couples to members 32. Alternatively, one member 32 could be used in place of the two members 32 shown. Mating joints 28 in handle 16 can operate as the points at which platform 20 couples to handle 16. For example, mating joints 28 could comprise holes (as shown) drilled into handle 16, and a nut and bolt 27 that travels through member 32 and handle 16 to couple platform 22 to handle 16. Member 32 can further comprise holes 36 such that platform 20 can be detachably coupled to handle 16. In such a manner, the height of handles 16 over stand 34 can be adjusted.

In the embodiment shown in FIG. 2, frame 14 has a profile with a proximate end coupled to pivot joint 18, a lower leg 37, and an upper leg 39. Axle 40 extends through wheel 12 and couples to lower leg 37 of frame 14. Wheel 12 rotates about axle 40. In the embodiment shown, several axle mating joints 38 are drilled into lower leg 37 of frame 14 such that axle 40 may detachably couple to each axle mating joint 38. In this manner, wheel 12 can be adjusted and coupled to frame 14 in different positions. It is a technical advantage of such an embodiment that the horizontal dolly 10 thereby can be adjusted for varying sized loads. For example, a user may couple axle 40 into different axle mating joints 38 such that frame 14 is in a higher position with respect to wheel 12 such that an object carried on horizontal dolly 10 does not interfere with wheel 12 and has more clearance with respect to the ground.

In operation, horizontal dolly 10 is configurable to allow a user to adjust horizontal dolly 10 as appropriate for the desired use. A user can adjust platform 20 or a plurality of platforms 20 to desired locations on handles 16 (only one handle can be seen in FIG. 2). Platform 20 can be adjusted to attach to handle 16 through mating joints 28. Platform 20 can also be adjusted to account for different sized loads by varying the height of stand 34 by changing the point of coupling along member 32 with respect to handle 16. Horizontal dolly 10 is further configurable such that a user can adjust the height of frame 14 with respect to wheel 12 by adjusting the point of coupling between axle 40 and base leg 37 of frame 14.

In addition, as mentioned above, in one embodiment handles 16 can be adjusted to be closer or further apart by changing the point of coupling 16 at pivot joints 18. Further, an embodiment could allow an operator to adjust handles 16 to coupled higher up on frame 14, for example to upper leg 39.

Once the user has configured horizontal dolly 10, the user can pivot handled 16 about pivot joints 18 to grasp an object. The operator can then lift handles 16 which will lift the object. As mentioned above, platforms 20 can help in securing the object by providing the support from below the object. It is a technical advantage of the present invention that the object can be supported both below by platforms 20 as well as laterally by handles 16.

Further in operation, upper leg 39 of frame 14 can prevent a load from slipping forward on handles 16. For example, a user could carry several pieces of lumber by laying the pieces of lumber cross-wise on handles 16. The user could then lift up on handles 16 to move dolly 10. Upper leg 39 of frame 14 could prevent the lumber from sliding forward.

An additional embodiment as shown in FIG. 2 includes a container 44. Container 44 includes two J-brackets 42 coupled to a front lower surface. Container 44 further includes two spring pin brackets 43 coupled to a rear lower surface.

In operation, a user attaches container 44 to dolly 10 by coupling the J-brackets 42 to two frame pins 41 coupled to handles 16. The user then opens a spring pin of spring pin bracket 43, slides spring pin brackets 43 over handles 16, and then releases the spring pin of spring pin brackets 43 such that container 44 couples to handles 16.

It is a technical advantage of the present invention that an operator can use the configurable horizontal dolly 10 as a traditional wheel barrow.

FIG. 3 is a rear view of one embodiment of a configurable horizontal dolly according to the present invention.

Handles 16 pivotally couple to frame 14 at pivot joints 18. Wheel 12 couples to frame 14 and is operable to rotate. Platforms 20 couple to handles 16.

In the embodiment of FIG. 3, frame 14 comprises an upper leg 39 with a substantially rectangular profile. However, the present invention contemplates that upper leg 39 could comprise any number of configurations. For example, upper leg 39 could comprise two members extending upward from frame 14. Frame pins 41 couple to upper leg 39 and are operable to receive j-brackets 42 (FIG. 2) of container 44 (FIG. 2).

In operation, an operator may couple container 44 (FIG. 2) onto dolly 10 by placing J-brackets 42 (FIG. 2) onto frame pins 41 and spring brackets 43 (FIG. 2) over handles 16. Alternately, an operator can leave container 44 (FIG. 2) off and use dolly 10 as discussed with respect to FIG. 1. Upper member 39 of frame 14 can operate to prevent the objects carried from sliding forward on handles 16.

Although the present invention has been described in detail, it should be understood that various changes, substitutions and alterations can be made thereto without departing from the spirit and scope of the invention as defined by the appended claims.

What is claimed is:

1. An apparatus for use as a configurable horizontal dolly for moving an object, the apparatus comprising:
    a frame having a longitudinal axis;
    a wheel rotatably coupled to the frame for contact with the ground in a direction along the longitudinal axis;
    a pair of substantially linear handles, each handle having a proximate end and a distal end, the proximate end of each handle coupled to the frame, wherein the proximate end of at least one of the handles is coupled to the frame such that the at least one handle can laterally pivot with respect to the frame and the longitudinal axis of the frame; and
    a first positionable platform coupled to a selected position along one of the handles, the first platform operable to slidingly engage a bottom surface associated with the object to support the object.

2. The apparatus of claim 1, wherein the proximate ends of both handles are pivotally coupled to the frame.

3. The apparatus of claim 2, further comprising a plurality of platforms where at least one of the plurality of platforms is coupled to each handle.

4. The apparatus of claim 3, wherein the plurality of platforms are detachably coupled to the handles such that each platform can be placed at different positions between the proximate end and distal end of the handles.

5. The apparatus of claim 4, further comprising:
    a plurality of mating joints spaced between the proximate end and the distal end of each handle wherein the plurality of platforms are operable to detachably couple to the mating joints.

6. The apparatus of claim 3, wherein each platform comprises:
    a member coupled to one of the handles; and
    a stand coupled to the member for supporting an object.

7. The apparatus of claim 6, wherein the member of each platform is detachably coupled to one of the handles such that the stand of each platform can be positioned at varying distances from the handle to which the platform is coupled.

8. The apparatus of claim 6, wherein each platform further comprises a second member coupled to one of the handles and the stand.

9. The apparatus of claim 2, further comprising two 180 degree hinges, each connected between the frame and the proximate end of one of the pair of handles.

10. The apparatus of claim 9, wherein the frame has a profile with a proximate end and a lower leg, wherein the proximate end is coupled to the handles, and wherein the axle is coupled to the frame at a point on the lower leg.

11. The apparatus of claim 10, wherein the axle is detachably coupled to the base leg of the frame such that the axle can be coupled at different points along the base leg of the frame.

12. The apparatus of claim 11, further comprising a plurality of axle mating joints spaced along the base leg of the frame wherein the axle is operable to detachably couple to each axle mating joint.

13. The apparatus of claim 2, further comprising an axle extending through the wheel and coupled to the frame, the wheel operable to rotate about the axle.

14. The apparatus of claim 2, further comprising a container detachably coupled to the handles, the container for holding an object.

15. The apparatus of claim 2, wherein the frame further comprises an upper leg.

16. The apparatus of claim 2, wherein the frame surrounds the wheel.

17. An apparatus for use as a configurable horizontal dolly for moving an object, comprising:
    a frame having a longitudinal axis;
    a wheel rotatably attached to the frame for contact with the ground in a direction along the longitudinal axis;
    a first substantially linear handle, having a proximate end and a distal end, wherein the proximate end is pivotally coupled to the frame such that the first handle can pivot laterally with respect to the longitudinal axis of the frame, the first handle including a first positionable platform coupled to a selected position along the handle, the platform operable to slidingly engage a bottom surface associated with the object; and
    a second substantially linear handle, having a proximate end and a distal end, wherein the proximate end is pivotally coupled to the frame such that the second handle can pivot laterally with respect to the longitudinal axis of frame, the second handle including a second positionable platform coupled to a selected position along the handle, the platform operable to slidingly engage the bottom surface associated with the object.

18. The apparatus of claim 17, wherein the plurality of platforms are detachably coupled to either the first handle or the second handle such that each platform can be placed at different positions between the proximate end and distal end of the first handle or the second handle.

19. The apparatus of claim 18, further comprising:
    a plurality of mating joints spaced between the proximate end and the distal end of the first handle; and
    a plurality of mating joints spaced between the proximate end and the distal end of the second handle;
    wherein the plurality of platforms are operable to detachably couple to the mating joints.

20. The apparatus of claim 19, wherein each platform comprises:
    a member coupled to either the first handle or the second handle; and
    a stand coupled to the member for supporting the object.

21. The apparatus of claim 20, wherein the member of each platform is detachably coupled to either the first handle or the second handle such that the stand of each platform can be positioned at varying distances from the handle to which the platform is coupled.

22. The apparatus of claim 20, wherein each platform further comprises a second member coupled to one of the handles and the stand.

23. The apparatus of claim 17, further comprising an axle extending through the wheel and coupled to the frame, the wheel operable to rotate about the axle.

24. The apparatus of claim 23, wherein the frame has a profile with a proximate end and a base leg, wherein the proximate end is coupled to the first handle and the second handle, and wherein the axle is coupled to the frame at a point on the base leg.

25. The apparatus of claim 24, wherein the axle is detachably coupled to the base leg of the frame such that the axle can be coupled at different points along the base leg.

26. The apparatus of claim 25, further comprising a plurality of axle mating joints spaced along the base leg of the frame wherein the axle is operable to detachably couple to each axle mating joint.

27. The apparatus of claim 17, further comprising a container detachably coupled to the first handle and the second handle for holding the object.

28. The apparatus of claim 17, further comprising:
   a first 180 degree hinge connecting the frame and the proximate end of the first handle; and
   a second 180 degree hinge connecting the frame and the proximate end of the second handle.

29. The apparatus of claim 17, wherein the frame further comprises an upper leg.

30. The apparatus of claim 17, wherein the frame surrounds the wheel.

31. A method for manufacturing a configurable horizontal dolly for moving an object, comprising:
   providing a frame having a longitudinal axis;
   rotatably coupling a wheel to the frame for contact with the ground in a direction along the longitudinal axis;
   coupling a pair of substantially linear handles to the frame, each handle having a proximate end and a distal end, wherein the proximate end of at least one of the handles is coupled to pivot laterally with respect to the frame aid the longitudinal axis of the frame; and
   coupling a platform to a selected position along either handle, the platform operable to slidingly engage a bottom surface associated with the object such that the platform can support the object.

32. The method of claim 31, wherein both handles are coupled to pivot with respect to the frame.

33. The method of claim 32, wherein pivotally attaching the first handle and the second handle to the frame comprises:
   coupling a first 180 degree hinge to the frame;
   coupling the proximate end of first handle to the first 180 degree hinge;
   coupling a second 180 degree hinge to the frame; and
   coupling the proximate end of second handle to the second 180 degree hinge.

34. The method of claim 31, further comprising:
   coupling a first platform to a first of the handles; and
   coupling a second platform to a second of the handles.

35. The method of claim 34, further comprising drilling a plurality holes spaced between the proximate end and the distal end of each handle to serve as mating joints for the first platform and the second platform, such that the first platform and the second platform can be detachably coupled to each mating joint.

36. The method of claim 31, further comprising:
   providing an axle extending through the wheel wherein the wheel rotates about the axle;
   providing the frame such that the frame comprises a profile having a proximate end and a lower leg;
   coupling the proximate end of the frame to the handles; and
   coupling the axle to a point on the lower leg of the frame.

37. The method of claim 36, further comprising drilling a plurality of holes in the lower leg of the frame to serve as axle mating joints wherein the axle can be detachably coupled to each axle mating joint.

38. The method of claim 31, wherein the frame further comprises an upper leg.

39. The method of claim 31, further comprising detachably coupling a container to the handles.

* * * * *